(12) United States Patent
Tsunoda et al.

(10) Patent No.: US 6,504,102 B2
(45) Date of Patent: *Jan. 7, 2003

(54) INSULATING MATERIAL, WINDINGS USING SAME, AND A MANUFACTURING METHOD THEREOF

(75) Inventors: Tomoya Tsunoda, Hitachi (JP); Keiichi Morikawa, Komae (JP); Mitsuru Onoda, Takahagi (JP); Shigeo Amagi, Naka-gun (JP); Tatsuo Honda, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/944,135

(22) Filed: Sep. 4, 2001

(65) Prior Publication Data

US 2002/0056569 A1 May 16, 2002

Related U.S. Application Data

(63) Continuation of application No. 09/457,259, filed on Dec. 9, 1999, now Pat. No. 6,288,341, which is a continuation-in-part of application No. 09/257,013, filed on Feb. 25, 1999, now Pat. No. 6,069,430.

(30) Foreign Application Priority Data

Feb. 27, 1998 (JP) .............................................. 10-046820

(51) Int. Cl.[7] .............................................. H01B 17/54
(52) U.S. Cl. .............................. 174/137 B; 174/120 C; 427/104

(58) Field of Search ........................ 174/137 B, 120 SR, 174/120 C; 310/180, 45; 156/56; 427/104

(56) References Cited

U.S. PATENT DOCUMENTS

| | | | |
|---|---|---|---|
| 3,866,316 A | 2/1975 | Takechi et al. | ................ 29/605 |
| 4,001,616 A | 1/1977 | Lonseth et al. | ................ 310/45 |
| 4,157,414 A | 6/1979 | Smith | .......................... 442/237 |
| 4,160,926 A | 7/1979 | Cope et al. | .................. 310/215 |
| 4,376,904 A | 3/1983 | Horrigan et al. | ............ 310/208 |

(List continued on next page.)

FOREIGN PATENT DOCUMENTS

| JP | 55-53802 | * | 4/1980 |
|---|---|---|---|
| JP | 63-110929 | * | 5/1988 |

*Primary Examiner*—Dean A. Reichard
*Assistant Examiner*—W. David Walkenhorst
(74) *Attorney, Agent, or Firm*—Antonelli, Terry, Stout, & Kraus, LLP

(57) ABSTRACT

In order to provide windings for electrical rotating machines having an insulating film superior in electrical characteristics, a high heat conductive insulating film 11 is formed at outer periphery of wound conductor 10 using a high heat conductive insulating tape, which includes a mica layer 3, a reinforcement layer 5, and a high heat conductive filler layer 7, wherein the resin content in each layer of the mica layer 3 and the high heat conductive filler layer 7 is specified in the range of 10–25% by weight based on the whole weight of the material. 1–80% by weight of said filler is spherical.

22 Claims, 3 Drawing Sheets

U.S. PATENT DOCUMENTS

| | | |
|---|---|---|
| 4,400,226 A | 8/1983 | Horrigan ..................... 156/56 |
| 4,427,740 A | 1/1984 | Stackhouse et al. ........ 428/324 |
| 4,634,911 A | 1/1987 | Studniarz et al. ........... 310/215 |
| 4,760,296 A | 7/1988 | Johnston et al. .............. 310/45 |
| 4,806,806 A * | 2/1989 | Hjortsberg et al. ........... 310/45 |
| 5,464,949 A | 11/1995 | Markovitz et al. ...... 174/120 R |
| 5,723,920 A | 3/1998 | Markovitz et al. ............ 310/42 |
| 5,796,201 A * | 8/1998 | Kamitani et al. ........... 310/194 |
| 5,801,334 A | 9/1998 | Theodorides ......... 174/120 SR |
| 5,880,179 A * | 3/1999 | Ito et al. ..................... 523/433 |
| 6,069,430 A * | 5/2000 | Tsunoda et al. ............. 310/180 |
| 6,130,495 A | 10/2000 | Schulten et al. ............ 310/196 |
| 6,130,496 A | 10/2000 | Takigawa et al. ........... 310/196 |
| 6,140,590 A | 10/2000 | Baumann et al. ....... 174/137 B |
| 6,288,341 B1 * | 9/2001 | Tsunoda et al. ........ 174/137 B |

* cited by examiner

US 6,504,102 B2

INSULATING MATERIAL, WINDINGS USING SAME, AND A MANUFACTURING METHOD THEREOF

This application is a Continuation application of prior application Ser. No. 09/457,259, filed Dec. 9, 1999 now U.S. Pat. No. 6,288,341, which is a Continuation-In-Part application of application Ser. No. 09/257,013, filed Feb. 25, 1999, now U.S. Pat. No. 6,069,430, issued May 30, 2000.

BACKGROUND OF THE INVENTION

The present invention relates to an insulating material for forming a main insulation for windings of electrical machines, windings for electrical rotating machines using the insulating material, and a method for manufacturing the windings.

JP-A-63-110929 (1988) discloses a method of forming insulating film for electrical windings used in electrical rotating machines by applying an insulating material to a conductor bundle, which comprises a mica layer, a reinforcement layer, a filler layer containing fillers having a high thermal conductivity therein, and each of the layers contains thermosetting resin.

The insulating material is wound around the wound conductor bundle, and the insulating film for windings of electrical machines is formed by curing the resin in the insulating material under heating and pressurizing. The windings for electrical machines is manufactured by the steps comprising wrapping the conductor with the insulating material which comprises the above mica layer, reinforcement layer, and filler layer; impregnating thermosetting resin composition containing fine divided inorganic filler into the insulating layer; and curing the resin composition by heating under pressurizing.

Furthermore, a method is disclosed, wherein a thermosetting resin composition containing fillers is impregnated into or applied onto the mica foil before wrapping the conductor with the mica layer containing the reinforcement layer.

JP-A-55-53802 (1980) discloses an insulating material, wherein a synthetic fiber fibrid and a high heat conductive inorganic powder are mixed into bonded mica sheet, and a thermosetting resin is impregnated therein. The publication discloses an insulating sheet, which is formed by adhering glass cloth to the mica paper with epoxy resin.

SUMMARY OF THE INVENTION

The winding of electrical machines formed as described above using the insulating material does not have any problem as far as it is used for the electrical rotating machines operated at a low voltage. However, when the winding is used for electrical rotating machines operated at a high voltage such as commercial power generators, high voltage motors, and the like, electrical defects of the winding sometimes cause problems. The inventors of the present invention have investigated reasons why the electrical defects of the insulating material were caused.

As a result, it was found that when the insulating film for windings of electrical machines is formed onto the conductors, followed by curing under heating and pressurizing, a part of fine bubbles contained in the uncured resin of the mica layer, the reinforcement layer, and filler layer remained unremoved.

And, this was caused by insufficient flow or unbalanced flow of the impregnated resin in the insulating film during the curing process by pressurizing and heating to form the insulating film for windings of electrical machines, because the resin content in each of the mica layer and the filler layer in prepreg state was not at an appropriate content.

The present invention is aimed at providing insulating material for obtaining windings for electrical machines having an insulating film superior in electric characteristics, and windings for electrical machines having the insulating film superior in electric characteristics.

DETAILED DESCRIPTION OF THE PREFERRED EMBODIMENTS

Figure 1A:
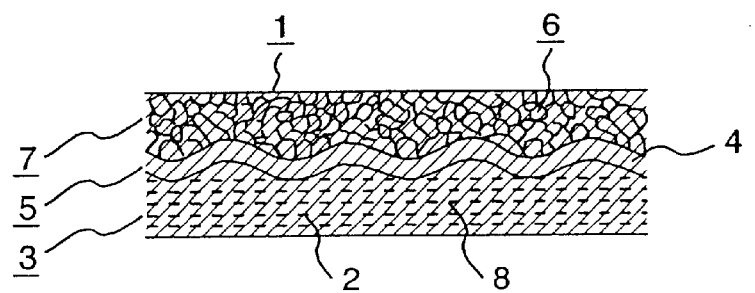
FIG. 1a and FIG. 1b are cross sectional views showing the material structures of the high heat conductive insulating tapes or sheets in the embodiments of the present invention.

According to one aspect of the present invention, an insulating material is provided wherein the insulating material comprises a insulating material layer of flaky inorganic insulating material such as flaky mica, a reinforcement layer for the flaky insulating layer, and a filler layer adhered to both the flaky insulating layer and the reinforcement layer or to the reinforcement layer, the flaky insulating layer, the reinforcement layer and the filler layer contain semi-cured resin, in which a resin content in each of the flaky insulating layer and the filler layer is 10 to 25% by weight of the whole weight of the insulating material, the difference in the resin content between the flaky insulating layer and the filler layer is not larger than 10% by weight of the whole weight of the insulating material.

In the above insulating material, the flaky inorganic insulating material is an inorganic flaky insulating material such as mica, and a mica layer formed by arranging the flaky mica in a direction with a thermosetting resin is a dielectric layer for ensuring electrical insulation of the windings and coils.

The reinforcement layer laminated adjoining to the inorganic insulating layer is a fibrous insulating material such as glass cloth, or a film such as polyimide film, for ensuring particularly the mechanical strength in two dimensional directions of the insulating material. The filler layer desirably comprises an inorganic filler having a thermal conductivity of at least 5 W/m·K and/or short-fiber, and in particular, it is effective that 1–80% by weight, desirably 2–50% by weight of the inorganic filler is spherical, globular or polyhedral. The remaining part is irregular shape or random shape. More preferably 5 to 20% by weight of the inorganic filler should be spherical, globular or polyhedral.

If an adequate amount of the spherical or polyhedral filler is contained, dispersion of the filler in the resin is improved, and an adequate flow of the resin composition can be obtained when a conductor bundle is wound by the insulating tape and cured under heating and pressurizing.

Accordingly, the fine bubbles in the wound insulating tape or sheet can be removed from the insulating layer with the resin.

The finely divided fillers such as granular filler or the flaky filler of alumina has desirably an average diameter of 0.1–20 microns, preferably 0.2–10 microns. If the particle size is too small, the viscosity of the thermosetting resin composition is increased to lower the flow property of the resin coposition, when the insulating material layer wound around the conductors is cured under pressurizing.

If the particle size is too large, the flaky mica can be damaged at the time of curing the insulating material under heating and pressurizing. Generally, the size of the spherical filler is desirably larger than the size of the irregular or infinite filler, because the thermal conductivity of the filler layer is increased by irregular or infinite filler that invades into gaps between the spherical filler.

An example of manufacturing method of the spherical filler comprises the step of blowing filler powder such as quartz powder, alumina powder, titanium oxide powder, and silicon oxide powder into flame for rounding the corners of the powder by melting a part of the surface of the powder. The shape of the spherical filler is not necessarily a real sphere. In comparison with untreated powder, flow property of the treated powder in the resin composition better the untreated powder. In accordance with using filler powder having random or infinite shapes in a combination with the spherical filler, flow property of the thermosetting resin can be maintained properly.

The mica layer desirable as the inorganic insulating material is a layer-comprising mica foils formed by gathering mica flakes. In particular, a sheet (mica paper) formed with mica flakes by paper making method and it is impregnated with a thermosetting resin. The mica flakes are arranged and laminated approximately in parallel with two dimensional directions of the tape, and bonded with the thermosetting resin.

The reinforcement layer comprises a reinforcement material, for instance, glass cloth and films such as polyimide film. In order to adhere the reinforcement material onto the mica paper, it is impregnated with a thermosetting resin, and the resin is semi-cured after adhering the reinforcement material onto the mica layer. As the reinforcement layer, various material such as glass cloth, any of woven cloth and non-woven cloth is usable, but woven cloth is preferable. Thickness of the glass cloth is not restricted, but approximately 0.04–0.1 mm is desirable.

Insulating films such as polyimide film can be used as a reinforcement material. The filler layer comprises a filler having a thermal conductivity of at least 5 W/m·K. High heat conductive inorganic particles of alumina, boron nitride, magnesium oxide, aluminum nitride, magnesium fluoride, silicon dioxide, aluminum fluoride, and the like, are dispersed and filled into a thermosetting resin. Divided alumina particulars and the like can be used as the filler. The inorganic particles are heat conductive layers having a role to transfer heat generated in the windings of electrical rotating machines and to radiate the heat outside.

In particular, an inorganic filler having a thermal conductivity of at least 30 W/m·K, for instance, alumina, boron nitride, and the like are preferable. The inorganic filler can exist not only in the filler layer, but also in networks of the cloth in the reinforcement layer. It is desirable that spherical or polyhedral filler of 1–80% by weight of the whole inorganic filler is used.

If an adequate amount of the spherical or polyhedral filler is used, dispersion of the non-spherical filler in the resin is improved, an adequate flow property of the resin composition can be obtained when the insulating material layer is formed and cured under pressurizing, and fine bubble contained in the insulating material layer can be squeezed with the resin outside the layer. The insulating material comprises resin, for instance, a thermosetting resin such as epoxy resin, unsaturated polyester resin, alkyd resin, melamine resin, polyimide resin, and the like, and an amount of all the resin is in a range of 20–50% by weight to the whole weight of the insulating material.

The resin content in each of the mica layer and in the filler layer are adjusted to be in the range of 10–25% by weight to the whole weight of the insulating material, respectively.

The reason to adjust the resin content in each of the mica layer and the filler layer to be at least 10% by weight to the total weight of the insulating material is as follows:

The insulating material is used in a prepreg state. That is, the thermosetting resin impregnated into or filmed onto the mica layer, reinforcement layer, and the filler layer is semi-cured to be B-stage (a non-adhering condition in handling).

In a process when insulating film for the electrical windings is formed by wrapping the insulating material tape or sheet around the conductor bundle so as to form necessary number of layers for obtaining a necessary dielectric strength, and integrating the insulating film by heating and pressurizing, fine bubbles contained in each of the mica layer, the reinforcement layer, and the filler layer are squeezed with excess resin.

In order to ensure the amount of the resin necessary for removing the bubbles with resin, and maintaining insulation and mechanical strength, it is necessary to make each of the mica layer and the filler layer contain at least 10% by weight of resin to the total weight of the insulating material. The resin content in each of the mica layer and the filler layer is restricted to be equal to or less than 25% by weight to the whole weight of the insulating material.

If the amount exceeds 25% by weight, the workability in wrapping the insulating material around the conductors is decreased, wrinkles are caused in the insulating material, and a preferable insulating film can not be formed. Furthermore, the amount of the filler becomes insufficient relatively, and the thermal conductivity of the insulating material is decreased. In particular, the resin content in each of the mica layer and the filler layer is preferably adjusted to be in the range of 12–18% by weight. In this case, the total amount of the resin is in the range of 24–36% by weight to the whole weight of the insulating material. The resin content in the reinforcement layer is calculated by being included in the resin content in the mica layer.

In the insulating material according to the present invention, the difference in the resin content between the mica layer and the filler layer was made equal to or less than 10% by weight, particularly, equal to or less than 5% by weight. Most preferably, the resin content in each of the layers are approximately equal. Here, the difference of the resin content in the mica layer from the resin content in the filler layer must be made equal to or less than 10% by weight.

If the difference in the resin content between the mica layer and the filler layer exceeds 10% by weight, a part of the resin including fine bubbles, which should be removed outside insulating film, is transferred to the layer containing less resin from the layer containing much resin and remained therein, in the process of curing when forming the insulating film for electrical windings.

In particular, when the difference in the resin content between the mica layer and the filler layer is equal to or less than 5% by weight, the flow of the excess resin into other layers is hardly occurred. Accordingly, it is most preferable when the resin content in both layers are approximately equal.

The resin content in the reinforcement material, for instance, such as glass cloth, is equal to or less than approximately 7% by weight to the whole weight of the insulating material, and generally in the range of 3–5% by weight.

The electrical windings relating to the present invention comprises a dielectric layer, a reinforcement layer, and a heat conductive layer, and the insulating film is formed using the insulating material, wherein the resin content in each of the dielectric layer and the heat conductive layer is in the range of 10–25% by weight to the total weight of the insulating material. The dielectric layer is a mica layer comprising mica flakes. The reinforcement layer is a layer comprising reinforcement material, for instance, such as glass cloth, or polyimide film. The heat conductive layer is a filler layer comprising filler having a thermal conductivity of at least 5 W/m·K, for instance, alumina.

Each of the layers comprises a thermosetting resin, for instance, such as epoxy resin. The total resin content is in the range of 20–50% by weight to the whole weight of the insulating material, and the resin content in each of the mica layer and in the filler layer is in the range of 10–25% by weight to the whole weight of the insulating material, respectively.

The insulating material of the present invention is made a tape or a sheet; a conductor bundle, each strand of which is insulated, is wrapped with the tape or the sheet of the insulating material overlaying tightly to form an insulating film having a desired thickness. The insulating film is contained in a non-sealed mold, for example, and the thermosetting resin contained in the tape or the sheet is cured by heating under pressurizing. In this process, a part of the resin is squeezed with bubbles from the insulating layer.

Therefore, the mold is desirably non-sealed type. An ideal resin content in the tape or the sheet is in the range of 25–40% by weight, and the amount of the thermosetting resin remained finally in the main insulating layer is desirably in the range of 20–30% by weight to the weight of the main insulating film. In particular, the range of 24–28% by weight is preferable.

The insulating material is wound around the outer periphery of the wound conductor bundle so that either of the mica layer or the filler layer comes to closest to the wound conductor. Subsequently, a releasing agent is applied onto the outer periphery of the insulating material. A forming jig is attached to the winding, and an external force (approximately 20–50 kg/cm$^2$) and heat (up to approximately 180° C.) are applied from the surface via the jig.

Then, the insulating film is formed by curing the resin in the insulating material with removing the fine bubbles contained in the insulating material with a part of the resin in the insulating material. The electrical windings manufactured as described above are inserted into slots of a stator or a rotator, and the aimed electrical rotating machine is manufactured.

In accordance with the present invention, the insulating layer formed on the conductor bundle can obtain a remarkably superior electrical characteristics, for instance, such as an alternating current dielectric breakdown voltage of 26.5–29.0 kV/mm.

Figure 4:
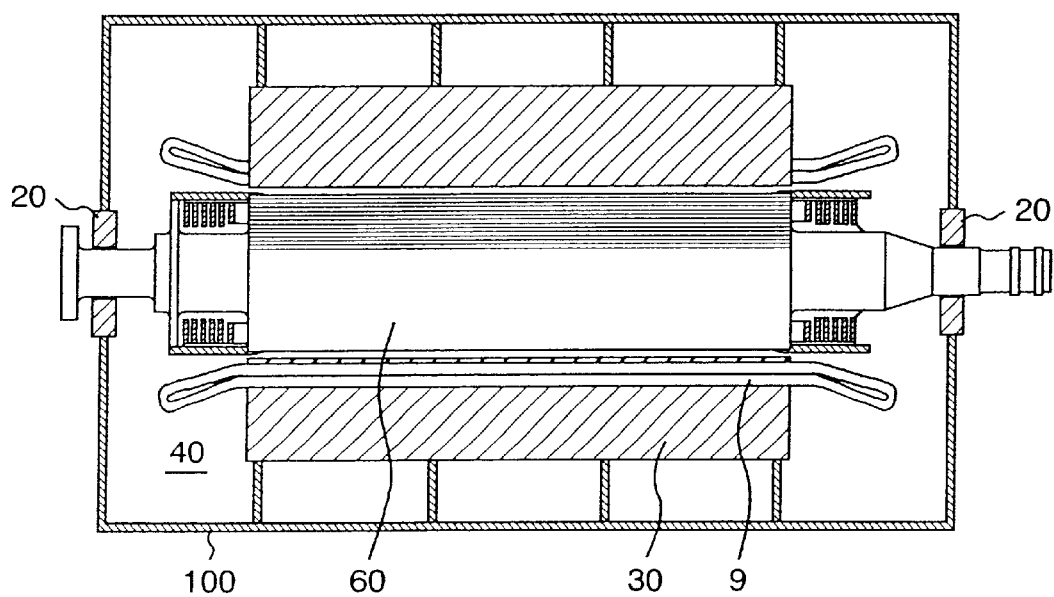
FIG. 4 is a cross sectional view showing the structure of electrical rotating machine in the embodiment of the present invention.
Figure 5:
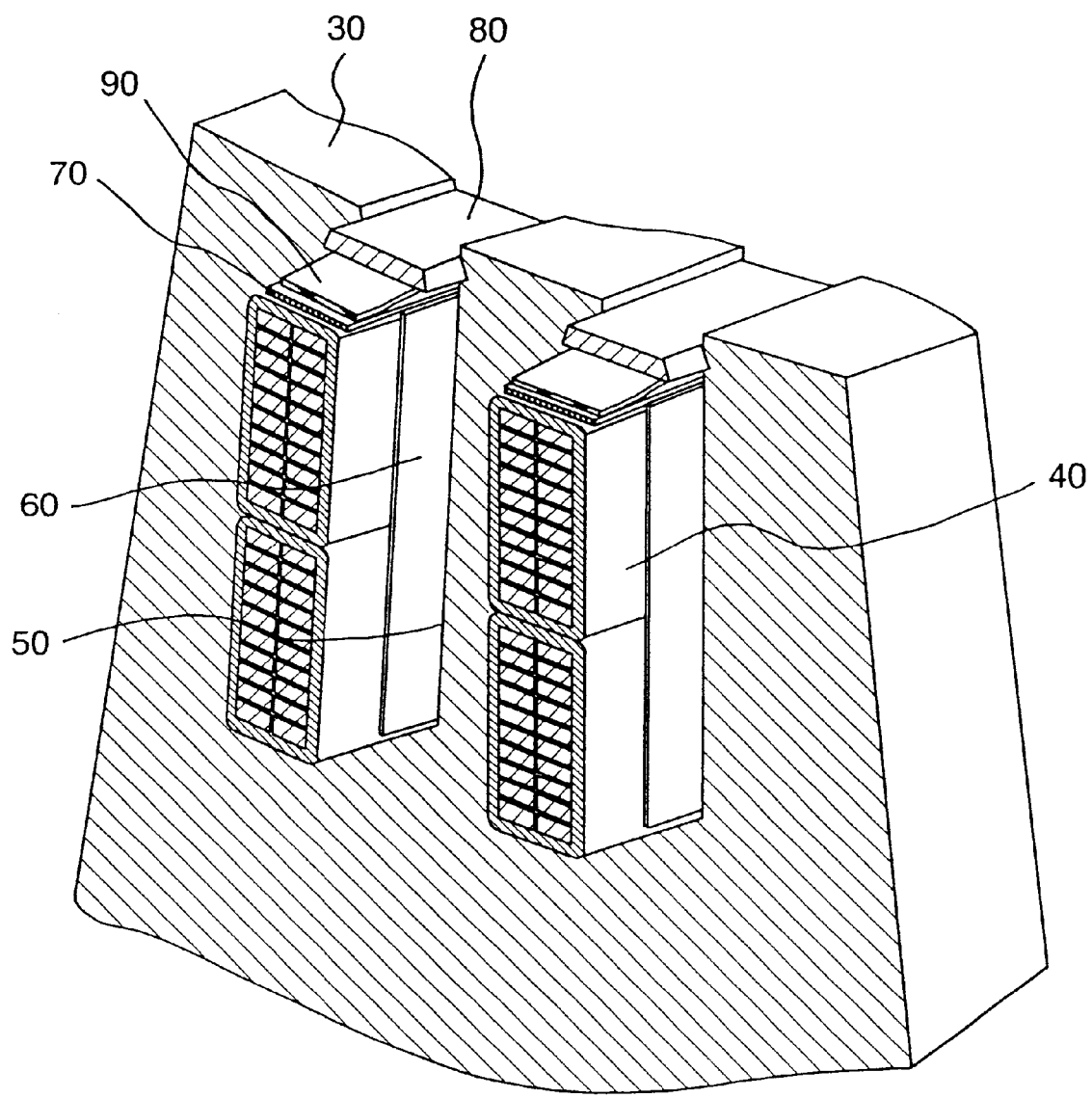
FIG. 5 is a cross sectional perspective view showing the structure of stator shown in FIG. 4.

FIG. 4 shows a cross sectional view of an electrical rotating machine, whereto the present invention is applicable, and FIG. 5 shows a cross sectional perspective view of a stator of the electrical rotating machine, whereto the present invention was applied. In the figures, the stator 30 is supported by the stator frame 100. The winding 9 manufactured by the present invention is inserted into the slots 50 of the stator. The rotor 60 is assembled similarly. The rotor 60 is rotatably supported to the stator frame 100 by the bearing 20. The winding 9 inserted into the stator slots 50 is fixed in the slots by the spring 60, 90 and the wedge 80.

(Embodiment 1)

Hereinafter, an embodiment of the present invention is explained referring to drawings. A structure of material for the high heat conductive insulating tape 1 (high heat conductive prepreg tape) of the embodiment of the present invention is explained hereinafter referring to FIG. 1a. The high heat conductive insulating tape 1 comprises a laminated body, wherein a mica layer 3 (high dielectric strength layer) comprising a mica paper 2, a reinforcement layer 5 comprising glass cloth 4, and a high heat conductive filler layer 7 (heat conductive layer) comprising alumina particles 6 are laminated in the order of the above description.

Figure 1B:
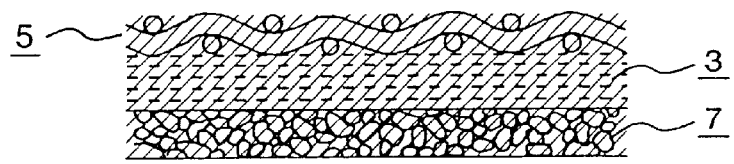

The laminated body also may be formed by laminating in the order of the high heat conductive filler layer 7, the mica layer 3, and the reinforcement layer 5 as shown in FIG. 1b.

The high heat conductive insulating tape 1 also contains the resin 8 in each of the mica layer 3, the reinforcement layer 5, and the high heat conductive filler layer 7, and the total amount of the resin 8 is 31.4% by weight to the whole weight of the high heat conductive insulating tape 1. The resin content in the mica layer 3 is 12.9% by weight to the whole weight of the high heat conductive insulating tape 1, and the resin content in the high heat conductive filler layer 7 is 15.0% by weight to the whole weight of the high heat conductive insulating tape 1. Accordingly, the resin content in the glass cloth layer is 3.5% by weight.

The high heat conductive insulating tape 1 was prepared as follows:

First, a mica paper 2 (weight 165 g/m$^2$) manufactured by a paper making machine with small mica flakes dispersed in water, and a glass cloth 4 (weight 35 g/m$^2$) were prepared. A resin composition comprising 3 parts by weight of $BF_3$ monoethylamine and 100 parts by weight of novolak type epoxy resin was impregnated into the mica paper 2 and the glass cloth 4 (impregnated amount 85 g/m$^2$), and a mica paper(a laminated body of the mica layer 3 and the reinforcement layer 5) was obtained by adhering them.

Then, the resin composition comprising 3 parts by weight of $BF_3$ monoethylamine, 100 parts by weight of novolak type epoxy, and alumina particles 6 was prepared wherein a weight ratio of the alumina particles 6 to the resin 8 was 2:1. After adding methylethylketone of 10% by weight to the composition, the resin composition was applied onto the plane of the bonded mica sheet on the reinforcement layer 5 side by a roll coater so that the filming amount of the resin was 256 (g/m$^2$).

Then, the high heat conductive insulating sheet was obtained by evaporating and removing the methylethylketone in a drying oven. The high heat conductive insulating tape 1 was obtained by slitting the high heat conductive insulating sheet into tapes with 30 mm wide by a slitter.

Figure 2:
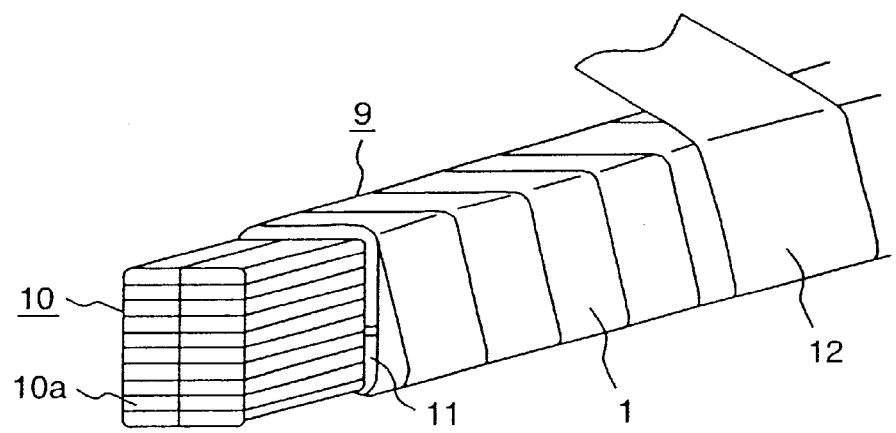
FIG. 2 is a perspective view showing the structure of the windings for electrical machines in the embodiment of the present invention.

A structure of winding for electrical rotating machines 9 in the embodiment of the present invention is explained hereinafter referring to FIG. 2. The winding for electrical rotating machine 9 comprises a wound conductor 10 formed by winding plural insulated conductors 10a, and high heat conductive insulating film 11 formed at the outer peripheral portion of the wound conductor 10. The winding for electrical rotating machine 9 was prepared as follows:

First, a plurality of insulated conductors 10a were wound several times for forming a wound conductor 10, as indicated in FIG. 2. Then, the high heat conductive insulating tape 1 indicated in FIG. 1a was taped by partial overlapping around the outer periphery of the wound conductor 10. The high heat conductive insulating tape 1 was so taped on the conductor that the mica layer 3 or the high heat conductive filler layer 7 comes inside, but in the present embodiment, the high heat conductive insulating tape 1 was so taped that the mica layer was to be in contact with the wound conductor 10.

In the case where the high heat conductive insulating tape shown in FIG. 1b is used, the reinforcement layer 5, or the high heat conductive filler layer 7 is in contact with the wound conductor 10. Subsequently, releasing tape 12 was wrapped around the outer periphery of the insulating layer of the high heat conductive insulating tape 1. The reason to wind the releasing tape 12 at the outer periphery of the high heat conductive insulating tape 1 is to prevent adhesion of a molding jig, which would be explained later, and the high heat conductive insulating tape 1.

Figure 3:
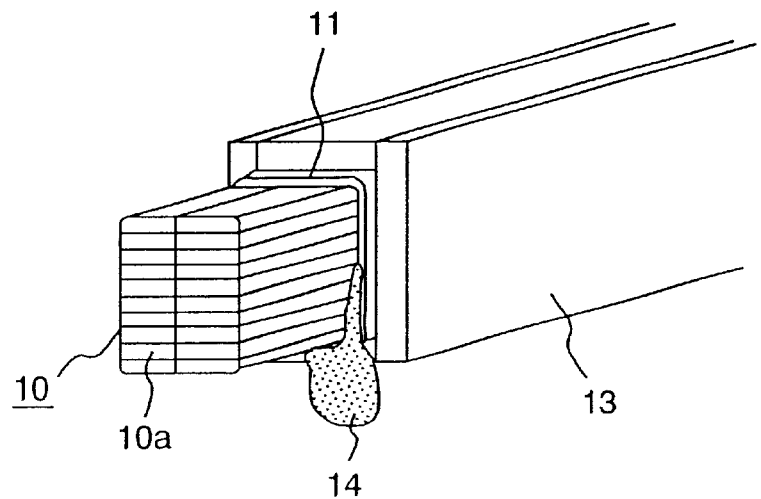
FIG. 3 is a perspective view for explaining a manufacturing process of the windings for electrical machines of the embodiment of the present invention.

Subsequently, the molding jig 13 comprising heating and pressurizing means (not shown in the figure) was attached to the wound conductor 10 as shown in FIG. 3, and an external force was applied from the surface via the jig 13. Then, the high heat conductive insulating layer 11 was formed by heating at a predetermined temperature for curing the resin 8 in the high heat conductive insulating tape 1 with removing the fine bubbles contained in the high heat conductive insulating tape 1 together with a part of the resin 14 in the high heat conductive insulating tape 1, and thus the winding for electrical rotating machines 9 was obtained.

The winding 9 for electrical rotating machines manufactured in the present embodiment as described above is assembled into core slots of electrical rotating machines such as power generators, motors, and the like.

As indicated previously, the resin content in each of the dielectric layer and the heat conductive layer is in the range of 10%–25% by weight to the total weight of the insulating material. Taking into account amounts of materials in this Embodiment 1, resin content in the dielectric (mica) layer can be in the range of 24–44% by weight of the total weight of the dielectric (mica)layer, and resin content in the heat conductive layer can be in the range of 25–45.5% by weight of the total weight of the heat conductive layer.

That the resin content in the dielectric layer can be about 24–44% by weight of the whole weight of the dielectric layer, and the resin content in the heat conductive layer can be about 25–45.5% by weight of the whole weight of the heat conductive layer, are shown by the following calculations, using the following values:

| | | |
|---|---|---|
| (a) Mica weight | 165 g/m² | (31.9 wt %) |
| (b) Reinforcement material (glass sheet) weight | 35 g/m² | (6.76 wt %) |
| (c) High thermal conductivity filler (alumina) weight<br>256 × ⅔(ratio of alumina: resin = 2:1)/1.1 (10%) = 155.2 | 155.2 g/m² | (30 wt %) |
| (d) resin in the mica layer (dielectric layer) | 66.8 g/m² | (12.9 wt %) |
| (e) resin in the high thermal conductivity layer<br>256 × ⅓(ratio of alumina to resin = 2:1) + 1.1 (10%) = 77.7 | 77.7 g/m² | (15.0%) |
| (f) resin in the reinforcement layer<br>31.4 − (12.9 + 15.0) = 3.5 | 18.1 g/m² | (3.5 wt %) |
| (d) + (e) + (f) = 66.8 + 77.7 + 18.1 = 162.6 g/m² | | |
| (g) Total weight of the insulating material<br>165 + 35 + 155.2 + 66.8 + 77.7 + 18.1 = 517.8 | 517.8 g/m² | (100 wt %) |
| (h) Calculation based on the above results (a) to (f):<br>Resin content in the mica layer = 517.8 × 10%~25% = 51.78~129.45 g/m²<br>Resin content in high thermal conductivity layer = 517.8 × 10%~25% = 51.78~129.45 g/m²<br>Resin content in the mica layer − 51.78/(51.78 + 165)~129/45/(129.45 + 165) = 24~44.0 wt %<br>Resin content in high thermal conductivity layer = 51.78/(51.78 + 155.2)~129.45/(129.45 + 155.2) = 25.0~45.5 wt %. | | |

(Comparative Tests)

Next, results of tests on the alternating current breakdown voltage of the windings for electrical rotating machines of the present embodiment and of windings for electrical rotating machines of the comparative example are explained based on Table 1. As the windings for electrical rotating machines of the comparative example, the windings comprising the high heat conductive insulation formed by the high heat conductive insulating tape, which was prepared by the following process, were used. The process for preparing the high heat conductive insulating tape is as follows:

First, a mica paper 2 (weight 165 g/m²) manufactured by a paper making machine with small mica flakes dispersed in water, and a glass cloth 4 (weight 35 g/m²) were prepared. A resin composition comprising 3 parts by weight of $BF_3$ monoethylamine, and 100 parts by weight of novolak type epoxy resin was impregnated into the mica paper 2 and the glass cloth 4 (impregnated amount 40 g/m²), and a bonded mica sheet(laminated of a laminated body of the mica layer 3 and the reinforcement layer 5) was obtained.

Then, the resin composition comprising 3 parts by weight of $BF_3$ monoethylamine, 100 parts by weight of novolak type epoxy resin, and alumina particles 6 was so prepared that a weight ratio of the alumina particles 6 to the resin 8 became 3.5:1. After adding methylethylketone of 10% by weight, the resin composition was applied onto the plane of the bonded mica sheet on the reinforcement layer 5 side by a roll coater so that the filming amount of the resin composition became 230 g/m². Then, the high heat conductive insulating sheet was obtained by evaporating and removing the methylethylketone in a drying oven.

The high heat conductive insulating tape 1 was obtained by slitting the high heat conductive insulating sheet to 30 mm wide by a slitter. A total resin content in the insulating sheet was 19.3 weight. The resin content in the mica layer was 7.1% by weigh to the whole weight of the high heat conductive insulating tape 1, and the resin content in the high heat conductive filler layer was 10.4% by weight to the whole weight of the high heat conductive insulating tape 1. Accordingly, the resin content in the glass cloth layer was 1.8% by weight.

Then, the winding for electrical rotating machine 9 was prepared using the high heat conductive insulating tape manufactured as described above. Since the method of manufacturing was as same as that mentioned above, its explanation is omitted.

In the test on the alternating current breakdown voltage, an aluminum foil was wound respectively around the outer periphery of the windings for electrical machines of the present embodiment and of the comparative example as an anode, and the alternating current breakdown voltages were measured by supplying an alternating current voltage between the aluminum electrode and the winding conductor of each winding for electrical rotating machines. The results were as shown in Table 1.

TABLE 1

|  | Embodiment | Comparative example |
|---|---|---|
| Observed values (kV/mm) | 26.5 | 19.0 |
|  | 29.0 | 17.5 |
|  | 27.5 | 21.5 |
| Average (kV/mm) | 27.7 | 19.3 |

As shown in Table 1, the windings for electrical rotating machines of the present invention had higher alternating current breakdown voltage than the windings for electrical rotating machines of the comparative example. Because the high heat conductive insulating layer of the windings for electrical rotating machines was formed using the high heat conductive insulating tape, wherein the resin content in each of the mica layer and the high heat conductive filler layer was specified to the range of 10–25% by weight based on the whole weight of the insulating material, and because fine bubbles or voids contained in the high heat conductive insulating tape could be removed sufficiently together with a part of the resin in the high heat conductive tape in the pressurizing process during forming the high heat conductive insulating film of the windings for electrical rotating machines. Because the windings for electrical rotating machines of the present invention is provided with a dense high heat conductive insulating film superior in electrical characteristics, a high reliability can be assured in the electrical rotating machines operated at a high voltage.

(Embodiment 2)

Next, another embodiment is explained, wherein infinite or random filler (A) and filler (B) having a spherical shape are used concurrently.

In the present embodiment, a sheet was prepared by adhering a glass cloth of 0.03 mm thick to a unfired mica paper of 0.08 mm thick, which was manufactured by a paper making machine with small mica flakes dispersed in water, with a resin composition comprising 3 parts by weight of $BF_3$ monoethylamine and 100 parts by weight of novolak type epoxy resin.

A random shape (infinite filler) filler powder and a spherical shaped filler were mixed in the ratios shown in Table 2 with the above resin composition with methylethylketone. The insulating material was obtained by applying the resin composition onto the plane of the above described mica sheet at reinforcement side with a roll coater. Mica tape was obtained by slitting the sheet into tapes with a width of 30 mm.

An insulated winding was prepared by wrapping the above described mica tape seven turns on a bundle of previously insulated conductors of 40 mm×10 mm×1000 mm long by a half-overlapping manner, heating at 110° C. for 15 minutes, and forming an insulating material film by heating at 170° C. for 60 minutes under a pressure of 5 MPa.

For comparison, electrical characteristics of winding for electrical rotating machines manufactured with an insulting tape using only the infinite filler, were measured. The results are shown in Table 2.

TABLE 2

|  | Composition of filler | Thermal conductivity (W/m·K) | Dielectric breakdown voltage (kV/mm) |
|---|---|---|---|
| No. 1 | A($AlF_3$; 97%)/ B($SiO_2$; 3%) | 0.55 | 28 |
| No. 2 | A($SiO_2$; 96%)/ B($SiO_2$; 4%) | 0.58 | 29 |
| No. 3 | A($SiO_2$; 93%)/ B($Al_2O_3$; 7%) | 0.57 | 28 |
| No. 4 | A($Al_2O_3$; 90%)/ B($Al_2O_3$; 10%) | 0.57 | 29 |
| Comparative example | A($Al_2O_3$; 100%) | 0.57 | 18 |

As shown in FIG. 2, an insulating layer having a high dielectric breakdown voltage can be obtained without losing any heat conductive property of the cured insulating layer by mixing the spherical filler into the random shape filler.

What is claimed is:

1. An insulating material comprising:
   a dielectric layer comprising flaky inorganic insulating material, bonded with a thermosetting resin;
   a reinforcement layer comprising a reinforcing material and the thermosetting resin; and
   a heat conductive layer comprising high heat conductive inorganic filler dispersed in the thermosetting resin, wherein said dielectric, reinforcement and heat conductive layers are laminated and adhered to form insulating tape or sheet, and 1–80% by weight of the high heat conductive inorganic filler is spherical.

2. An insulating material as claimed in claim 1, wherein the flaky inorganic insulating material in said dielectric layer is mica flakes.

3. An insulating material as claimed in claim 1, wherein the filler in said heat conductive layer is an inorganic insulating material having a thermal conductivity of at least 5 W/mK.

4. An insulating material as claimed in claim 1, wherein resin content in said dielectric layer and resin content in said heat conductive layer are approximately equal.

5. A method of manufacturing the insulating material as claimed in claim 1, wherein resin content in said dielectric layer and resin content in said heat conductive layer are approximately equal.

6. An insulating material as claimed in claim 1, wherein said dielectric layer is a separate layer from said heat conductive layer.

7. An insulating material comprising:
   a flaky mica layer bonded with a thermosetting resin;
   a reinforcement layer of fiber cloth or of film bonded to said mica layer with a thermosetting resin; and
   a filler layer comprising a high heat conductive inorganic filler dispersed in the thermosetting resin, which is adhered to said reinforcement layer, wherein said thermosetting resin is in a semi-cured condition and 1–80% by weight of the high heat conductive inorganic filler is spherical.

8. An insulating material as claimed in claim 7, wherein said insulating material is composed by laminating in the order of the flaky mica layer, the reinforcement layer, and the filler layer.

9. An insulating material as claimed in claim 7, wherein said insulating material is composed by laminating in the order of the reinforcement layer, the filler layer and the flaky mica layer.

10. An insulating material as claimed in claim 7, wherein said flaky mica layer is a separate layer from said filler layer.

11. A winding insulated with an insulating material comprising:
- a dielectric layer composed by aligning and bonding flaky inorganic insulating material with a thermosetting resin;
- a reinforcement layer, wherein material of the reinforcement layer contains the thermosetting resin; and
- a heat conductive layer composed of high heat conductive inorganic filler dispersed in the thermosetting resin, 1–80% by weight of the high heat conductive inorganic filler being spherical, wherein said layers are laminated and adhered to form a tape shaped insulating material, said inorganic filler is dispersed at least in the heat conductive layer, and an insulating layer is formed by taping said tape shaped insulating material around a wound conductor bundle to form an insulating film.

12. A winding as claimed in claim 11, wherein said flaky inorganic insulating material is flaky mica.

13. A winding as claimed in claim 11, wherein the filler in said heat conductive layer is an inorganic insulating material having a thermal conductivity of at least 5 w/mK.

14. A winding as claimed in claim 11, wherein resin content in said dielectric layer and resin content in said heat conductive layer are approximately equal.

15. A winding as claimed in claim 11, wherein said dielectric layer is a separate layer from said heat conductive layer.

16. An insulating material comprising:
- a dielectric layer comprising flaky inorganic insulating material, bonded with a thermosetting resin;
- a reinforcement layer comprising a reinforcing material and the thermosetting resin; and
- a heat conductive layer comprising high heat conductive inorganic filler dispersed in the thermosetting resin, wherein said layers are laminated and adhered to form insulating tape or sheet, the resin content in said dielectric layer is not less than 10% by weight of the whole weight of the insulating material, the resin content in said heat conductive layer is in a range of 10–25% by weight of the weight of the insulating material, and 1–80% by weight of said filler is spherical.

17. An insulating material comprising:
- a dielectric layer comprising flaky inorganic insulating material, bonded with a thermosetting resin;
- a reinforcement layer comprising a reinforcing material and the thermosetting resin; and
- a heat conductive layer comprising high heat conductive inorganic filler dispersed in the thermosetting resin, wherein said layers are laminated and adhered to form insulating tape or sheet, the resin content in said dielectric layer is about 24–44% by weight of the whole weight of said dielectric layer, and the resin content in said heat conductive layer is about 25–45.5% by weight of the whole weight of said heat conductive layer.

18. An insulating material comprising:
- a dielectric layer comprising flaky inorganic insulating material, bonded with a thermosetting resin;
- a reinforcement layer comprising a reinforcing material and the thermosetting resin; and
- a heat conductive layer comprising high heat conductive inorganic filler dispersed in the thermosetting resin, wherein said dielectric, reinforcement and heat conductive layers are laminated and adhered to form insulating tape or sheet, and 1–80% by weight of said filler is spherical, and wherein a difference in the resin content between said dielectric layer and said heat conductive layer is equal to or less than 5% by weight.

19. An insulating material comprising:
- a dielectric layer comprising flaky inorganic insulating material, bonded with a thermosetting resin;
- a reinforcement layer comprising a reinforcing material and the thermosetting resin; and
- a heat conductive layer comprising high heat conductive inorganic filler dispersed in the thermosetting resin, wherein said dielectric, reinforcement and heat conductive layers are laminated and adhered to form insulating tape or sheet, and 1–80% by weight of said filler is spherical, and wherein a whole amount of the resin in said insulating material is in a range of 20–50% by weight to the total weight of said insulating material.

20. An insulating material comprising:
- a dielectric layer comprising mica flakes, bonded with a thermosetting resin;
- a reinforcement layer comprising a reinforcing material and the thermosetting resin; and
- a heat conductive layer comprising high heat conductive inorganic filler dispersed in the thermosetting resin, wherein said dielectric, reinforcement and heat conductive layers are laminated and adhered to form insulating tape or sheet, and 1–80% by weight of said filler is spherical, and
- wherein a whole amount of the resin in said insulating material is in a range of 20–50% by weight to the total weight of said insulating material.

21. A winding insulated with an insulating material comprising:
- a dielectric layer composed by aligning and bonding flaky inorganic insulating material with a thermosetting resin;
- a reinforcement layer, wherein material of the reinforcement layer contains the thermosetting resin; and
- a heat conductive layer composed of high heat conductive inorganic filler dispersed in the thermosetting resin, 1–80% by weight of said filler being spherical, a difference in resin content between said dielectric layer and said heat conductive layer being equal to or less than 5% by weight,
- wherein said layers are laminated and adhered to form a tape shaped insulating material, said inorganic filler is dispersed at least in the heat conductive layer, and an insulating layer is formed by taping said tape shaped insulating material around a wound conductor bundle to form an insulating film.

22. A winding insulated with an insulating material comprising:
- a dielectric layer composed by aligning and bonding flaky inorganic insulating material with a thermosetting resin;
- a reinforcement layer, wherein material of the reinforcement layer contains the thermosetting resin; and
- a heat conductive layer composed of high heat conductive inorganic filler dispersed in the thermosetting resin, 1–80% by weight of said filler being spherical, wherein said layers are laminated and adhered to form a tape shaped insulating material, said inorganic filler is dispersed at least in the heat conductive layer, an insulating layer is formed by taping said tape shaped insulating material around a wound conductor bundle to form an insulating film, and a total amount of resin in said insulating material is in a range of 20–50% by weight to the whole weight of said insulating material.

* * * * *